(12) United States Patent
Choi et al.

(10) Patent No.: US 10,659,374 B2
(45) Date of Patent: May 19, 2020

(54) METHOD AND APPARATUS FOR CONTROLLING FRAME TRANSMISSION

(71) Applicant: ELECTRONICS AND TELECOMMUNICATIONS RESEARCH INSTITUTE, Daejeon (KR)

(72) Inventors: Chang Ho Choi, Daejeon (KR); Tae Kyu Kang, Daejeon (KR); Jeong Dong Ryoo, Daejeon (KR); Tae Sik Cheung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 84 days.

(21) Appl. No.: 16/143,966

(22) Filed: Sep. 27, 2018

(65) Prior Publication Data

US 2019/0104073 A1 Apr. 4, 2019

(30) Foreign Application Priority Data

Sep. 29, 2017 (KR) .................. 10-2017-0128104
Nov. 27, 2017 (KR) .................. 10-2017-0159553
Sep. 27, 2018 (KR) .................. 10-2018-0115062

(51) Int. Cl.
*H04J 3/06* (2006.01)
*H04L 12/851* (2013.01)
(Continued)

(52) U.S. Cl.
CPC .......... *H04L 47/245* (2013.01); *H04L 47/283* (2013.01); *H04W 28/06* (2013.01);
(Continued)

(58) Field of Classification Search
None
See application file for complete search history.

(56) References Cited

U.S. PATENT DOCUMENTS 7,751,330 B2 7/2010 Lee et al.
8,705,475 B2 4/2014 Moon et al.
(Continued)

FOREIGN PATENT DOCUMENTS

KR 10-2016-0014680 A 2/2016
WO 2015/094918 A1 6/2015

*Primary Examiner* — Sithu Ko
(74) *Attorney, Agent, or Firm* — LRK Patent Firm

(57) ABSTRACT

A frame transmission controlling apparatus includes: a list configuration unit managing a parameter related to a gate control; a cycle timer unit managing a start timing of a cycle; a list executing unit performing the gate control based on the parameter, wherein the list executing unit includes: a cycle executing state machine setting an expiration time of at least one section included in the cycle, checking gate operation information corresponding to a list pointer indicating the at least one section, and performing a control corresponding to the gate operation information; a delaying state machine deducting and updating the expiration time by a predetermined unit; a cycle holding state machine generating a control signal indicating stopping transmission in MAC; and a cycle releasing state machine generating a control signal indicating resuming the transmission in MAC.

19 Claims, 11 Drawing Sheets

(51) Int. Cl.
  *H04W 28/06*  (2009.01)
  *H04L 12/841*  (2013.01)
  *H04W 72/04*  (2009.01)
  *H04W 84/12*  (2009.01)
  *H04W 80/02*  (2009.01)

(52) U.S. Cl.
  CPC ........ *H04W 72/0446* (2013.01); *H04W 80/02* (2013.01); *H04W 84/12* (2013.01)

(56) References Cited

U.S. PATENT DOCUMENTS

| | | | |
|---|---|---|---|
| 9,256,471 B2* | 2/2016 | Kim | G06F 9/5038 |
| 9,455,905 B2* | 9/2016 | Thaler | H04L 45/30 |
| 10,511,455 B1* | 12/2019 | Sharma | H04L 47/2433 |
| 2002/0191603 A1* | 12/2002 | Shin | H04L 47/10 |
| | | | 370/389 |
| 2003/0026276 A1* | 2/2003 | Gazit | H04L 49/901 |
| | | | 370/412 |
| 2009/0257441 A1* | 10/2009 | Hata | H04L 47/10 |
| | | | 370/412 |
| 2010/0238941 A1* | 9/2010 | Matsuo | H04L 47/10 |
| | | | 370/400 |
| 2011/0158120 A1* | 6/2011 | Hamasaki | H04J 3/0641 |
| | | | 370/252 |
| 2015/0106819 A1 | 4/2015 | Kim et al. | |
| 2016/0043823 A1* | 2/2016 | Zhao | H04J 3/0697 |
| | | | 370/350 |
| 2016/0088524 A1* | 3/2016 | Pani | H04W 36/0005 |
| | | | 370/331 |

* cited by examiner

METHOD AND APPARATUS FOR CONTROLLING FRAME TRANSMISSION

CROSS REFERENCE TO RELAYED APPLICATIONS

The present application claims priority to Korean Patent Application Nos. 10-2017-0128104, 10-2017-0159553 and 10-2018-0115062, filed Sep. 29, 2017, Nov. 27, 2017, and Sep. 27, 2018, respectively, the entire contents of which is incorporated herein for all purposes by this reference.

BACKGROUND OF THE INVENTION

1. Field of the Invention

The present disclosure relates generally to a network communication technique. More particularly, the present disclosure relates to a method and apparatus for controlling data transmission based on frame preemption.

2. Description of Related Art

IEEE 802 LMSC (LAN (local area network)/MAN (metro area network) standard committee) has been focused on a time-sensitive networking (TSN) technique that secures time/jitter/delay by using Ethernet based wired/wireless LAN/MAN based on 802.1 WG (working group) so as to be applied to various industrial fields (broadcasting, manufacturing, transportation such as vehicles, home appliance, energy, etc.) which require time-sensitive traffic processing.

In IEEE802.1Qbv, which has been standardized in 2015, a method of stably transmitting data in a scheduled time section is provided by introducing a time aware gate (TAG).

Meanwhile, when transmitting a frame (for example, referred as "Aframe") having a priority set in a predetermined level, a frame preemption method is provided for interference of a frame (for example, referred as "Bframe") having relatively lower priority. Such a frame preemption method is configured to stop Bframe transmission when Aframe transmission is requested even though the Bframe transmission has started, and resume the Bframe transmission after completing the Aframe transmission.

The foregoing is intended merely to aid in the understanding of the background of the present invention, and is not intended to mean that the present invention falls within the purview of the related art that is already known to those skilled in the art.

SUMMARY OF THE INVENTION

An object of the present disclosure is to provide a method and apparatus capable of controlling data transmission by combining a scheduled traffic transmission technique and a frame preemption technique.

Another object of the present disclosure is to provide a configuration of a state machine capable of integrally providing scheduled traffic transmission technique and frame preemption technique, and a method and apparatus for controlling the same.

Technical problems obtainable from the present disclosure are not limited by the above-mentioned technical problems, and other unmentioned technical problems may be clearly understood from the following description by those having ordinary skill in the technical field to which the present disclosure pertains.

According to an aspect of the present disclosure, there is provided an apparatus for controlling frame transmission. The apparatus includes: a list configuration unit managing a parameter related to a gate control; a cycle timer unit managing a start timing of a cycle; and a list executing unit performing the gate control based on the parameter provided form the list configuration unit and the cycle timer unit, and the list executing unit may include: a cycle executing state machine setting an expiration time of at least one section included in the cycle, checking gate operation information in association with a list pointer indicating the at least one section, and performing a control in association with the gate operation information; a delaying state machine deducting the expiration time by a predetermined unit and updating the same; a cycle holding state machine generating a control signal indicating stopping transmission in MAC; and a cycle releasing state machine generating a control signal indicating resuming the transmission in MAC.

The cycle executing state machine may update the list pointer, and the list executing unit may further include a next cycle operation checking state machine provided between the cycle executing state machine and the delaying state machine, checking the gate operation information in association with the updated list pointer, and performing a control in association with the gate operation information.

The cycle timer unit may check gate operation information in association with a first section included in the cycle, and generate the control signal indicating stopping the transmission in MAC or the control signal indicating resuming the transmission in MAC based on the gate operation information.

According to another aspect of the present disclosure, there is provided a method of controlling frame transmission. The method includes: setting an expiration time of at least one section included in a cycle; checking gate operation information in association with a list pointer indicating the at least one section; in association that the gate operation information indicates stopping of transmission in MAC, setting a transmission stopping time; outputting information indicating stopping the transmission in MAC by a delaying state machine and a cycle holding state machine in which the expiration time and a transmission stopping time are set; in association that the gate operation information indicates resuming the transmission in MAC, setting a transmission resuming time; and outputting information indicating resuming the transmission in MAC by the delaying state machine and the cycle releasing state machine in which the expiration time and the transmission resuming time are set.

The checking of the gate operation information may be performed by a next cycle operation checking state machine checking gate operation information in association with a following temporal section The features briefly summarized above for the present disclosure are only exemplary aspects of the detailed description of the disclosure which follow, and are not intended to limit the scope of the disclosure.

According to the present disclosure, there is provided a method and apparatus of controlling data transmission by combining scheduled traffic transmission technique and frame preemption technique.

According to the present disclosure, there is provided a configuration of a state machine integrally providing scheduled traffic transmission technique and frame preemption technique, and a method and apparatus for controlling the same.

According to the present disclosure, there is provided a method and apparatus for controlling a frame transmission, the method and apparatus being capable of securing time/ jitter/delay in a bridge and a switch in a network and maximizing a link usage rate.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

Figure 1:
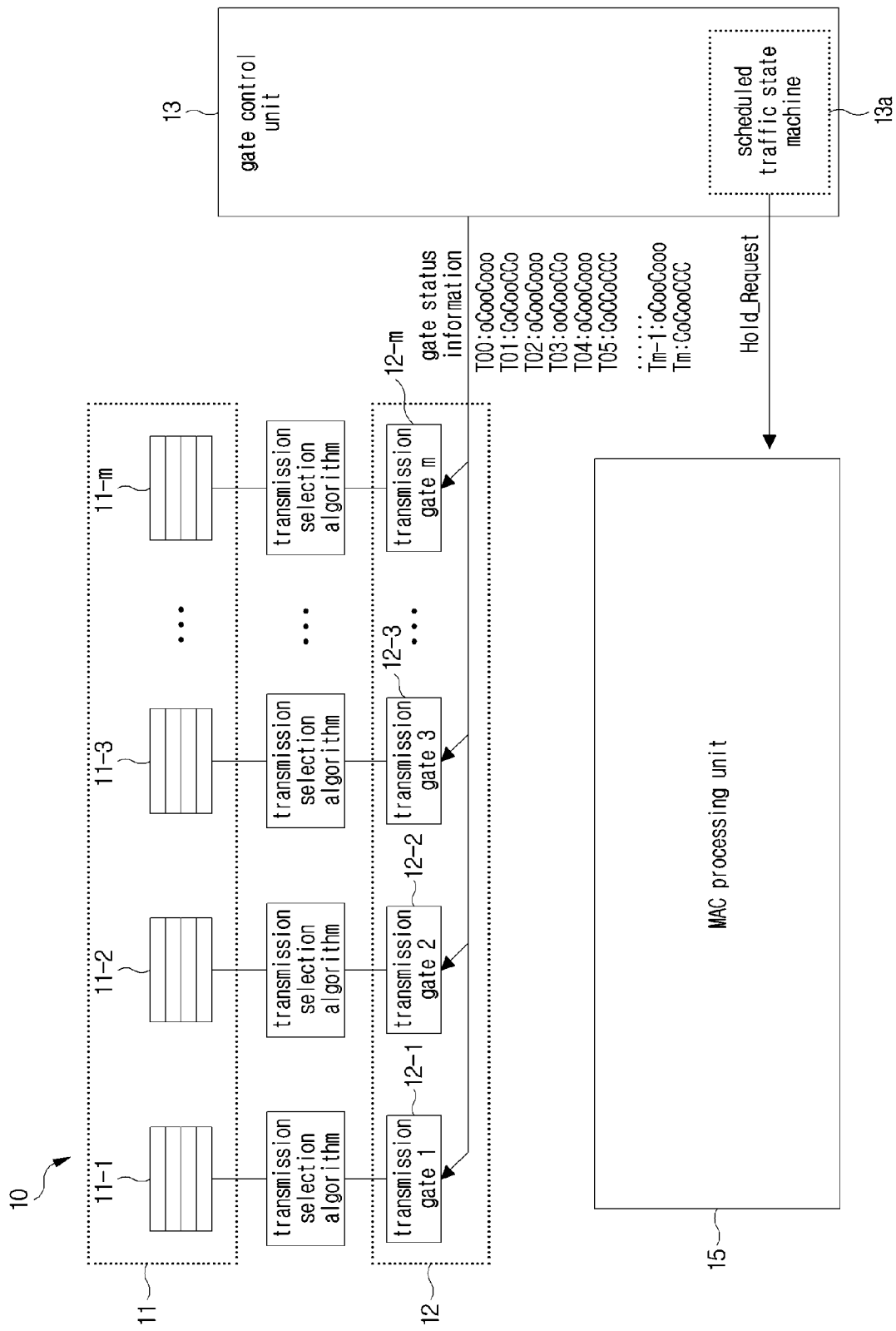
FIG. 1 is a view of an example showing a configuration of a frame transmission control apparatus according to an embodiment of the present disclosure.

Exemplary embodiments of the present disclosure will be described in detail with reference to the accompanying drawings such that the present disclosure can be easily embodied by one of ordinary skill in the art to which this invention belongs. However, the present disclosure may be variously embodied, without being limited to the exemplary embodiments.

In the description of the present disclosure, the detailed descriptions of known constitutions or functions thereof may be omitted if they make the gist of the present disclosure unclear. Also, portions that are not related to the present disclosure are omitted in the drawings, and like reference numerals designate like elements.

In the present disclosure, when an element is referred to as being "coupled to", "combined with", or "connected to" another element, it may be connected directly to, combined directly with, or coupled directly to another element or be connected to, combined directly with, or coupled to another element, having the other element intervening therebetween. Also, it should be understood that when a component "includes" or "has" an element, unless there is another opposite description thereto, the component does not exclude another element but may further include the other element.

In the present disclosure, the terms "first", "second", etc. are only used to distinguish one element, from another element. Unless specifically stated otherwise, the terms "first", "second", etc. do not denote an order or importance. Therefore, a first element of an embodiment could be termed a second element of another embodiment without departing from the scope of the present disclosure. Similarly, a second element of an embodiment could also be termed a first element of another embodiment.

In the present disclosure, components that are distinguished from each other to clearly describe each feature do not necessarily denote that the components are separated. That is, a plurality of components may be integrated into one hardware or software unit, or one component may be distributed into a plurality of hardware or software units. Accordingly, even if not mentioned, the integrated or distributed embodiments are included in the scope of the present disclosure.

In the present disclosure, components described in various embodiments do not denote essential components, and some of the components may be optional. Accordingly, an embodiment that includes a subset of components described in another embodiment is included in the scope of the present disclosure. Also, an embodiment that includes the components described in the various embodiments and additional other components are included in the scope of the present disclosure.

Hereinbelow, exemplary embodiments of the present invention will be described in detail with reference to the accompanying drawings.

In IEEE802.1Qbv, in order to transmit a scheduled traffic, "SetGateStates" for opening or closing a time aware gate and "scheduled traffic state machine" for executing the same are defined, and in an IEEE802.1Qbu standard, "Set-And-Hold-MAC" and "Set-And-Release-MAC" for stopping or resuming transmission of a frame having a low priority may be additionally defined for the frame preemption.

However, in IEE802.1Qbv or IEEE802.1Qbu, a process for performing operation related to the "Set-And-Hold-MAC" and "Set-And-Release-MAC" is not considered in a state machine.

Accordingly, in a method and apparatus for controlling frame transmission according to an embodiment of the present disclosure which will be described later, a configuration and operation of a state machine performing operation related to the "Set-And-Hold-MAC" and "Set-And-Release-MAC" will be described in detail.

Figure 2A:
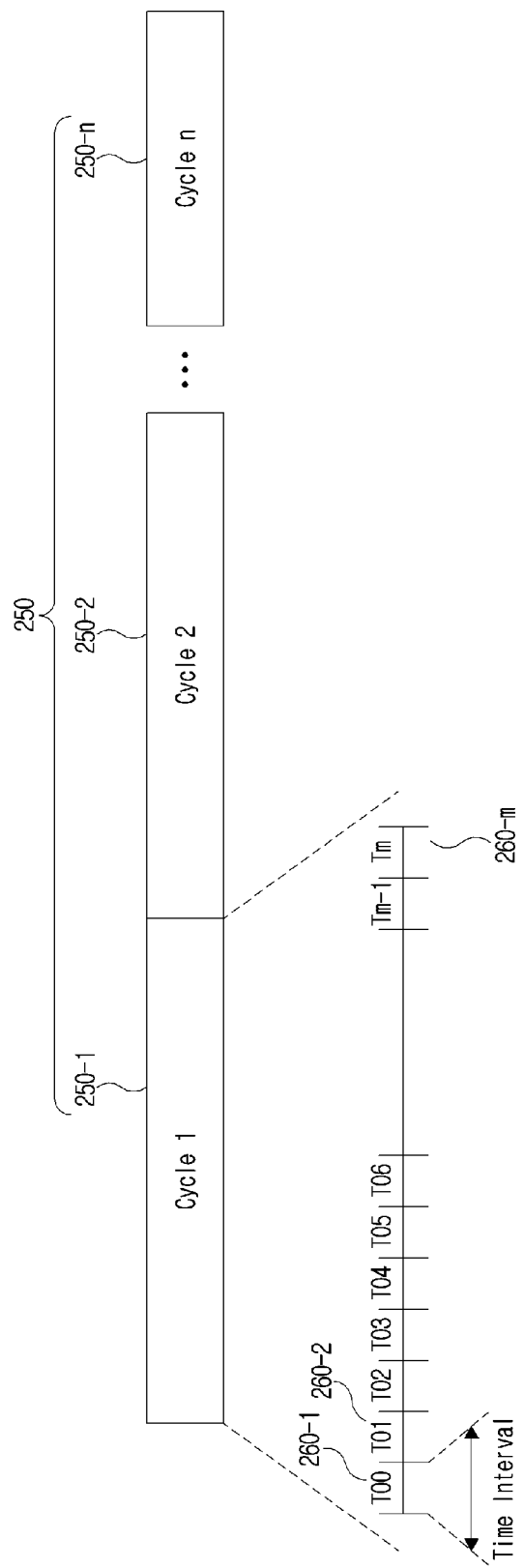
FIG. 2A is a view of an example showing a configuration of a cycle used in the frame transmission control apparatus of FIG. 1.
Figure 2B:
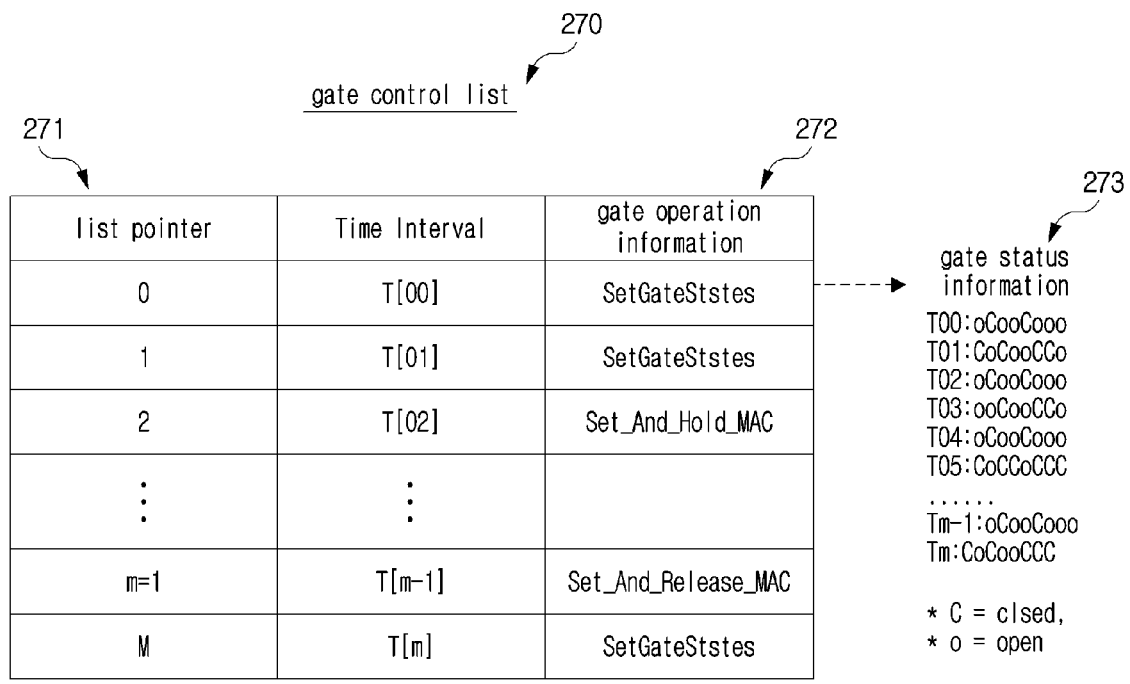
FIG. 2B is a view of an example showing a configuration of a gate control list used in the frame transmission control apparatus of FIG. 1.

FIG. 1 is a view of an example showing a configuration of a frame transmission control apparatus according to an embodiment of the present disclosure, FIG. 2A is a view of an example showing a configuration of a cycle used in the frame transmission control apparatus of FIG. 1, and FIG. 2B is a view of an example showing a configuration of a gate control list used in the frame transmission control apparatus of FIG. 1.

First, referring to FIG. 1, a frame transmission control apparatus 10 may include a plurality of traffic class queues 11, a plurality of transmission gates 12 in association with each traffic class queue 11, and a gate control unit 13.

The plurality of traffic class queues 11 may store a frame to be transmitted, and the plurality of transmission gates 12 may control states of the plurality of traffic class queues 11 on the basis of a gate control list provided for each predetermined time interval from the gate control unit 13.

For example, the gate control unit 13 may control frame transmission in consideration of a predetermined cycle unit (250, refer to FIG. 2A). Each cycle (250-1, 250-2, 250-$n$) may include a plurality of sections (260-1, 260-2, 260-$n$) divided by a predetermine time interval, and the plurality of sections (260-1, 260-2, 260-$n$) provided to each cycle may be identified by a list pointer.

Further, in a gate control list 270 (refer to FIG. 2B), gate control information in association with each section identified by a list pointer 271 may be included. The gate control information may include gate operation information 272 (operation name), and a control type of each section may be represented by using gate operation information 272.

In addition, when gate operation information 272 relates to setting a gate state (SetGateStates), the gate control information may further include gate status information 273, and the gate status information 273 may include a control identifier for controlling each gate.

For example, when a control identifier in association with a first transmission gate 12-1 indicates an "Open" state in a first section, the gate control unit 13 may provide a corresponding control signal to the first transmission gate 12-1 such that the first transmission gate 12-1 maintains an "Open" state during the corresponding section. Accordingly, the first transmission gate 12-1 may maintain an "Open" state, and data stored in a first traffic class queue 11-1 may be output during a first time interval.

On the other hand, when a control identifier in association with the first transmission gate 12-1 indicates a "Close" state in the first section, the gate control unit 13 may provide a corresponding control signal to the first transmission gate 12-1 such that the first transmission gate 12-1 maintains a "Close" state during the corresponding section. Accordingly, the first transmission gate 12-1 may maintain a "Close" state and the first traffic class queue 11-1 does not output stored data during the first time intervals.

Further, the gate control unit 13 may check gate operation information 272, and generate a control signal controlling the transmission gates 12 or an MAC processing unit 15 in consideration of the gate operation information 272, and provide the same. As a configuration unit for generating a control signal, a scheduled traffic state machine 13$a$ may be provided.

Particularly, the scheduled traffic state machine 13$a$ may support frame preemption, generate a control signal indicating stopping or resuming data transmission (for example, Hold_Request signal), and provide the same to the MAC processing unit 15.

Hereinafter, referring to FIGS. 3A and 3B, a configuration of a scheduled traffic state machine provided to the frame transmission control apparatus will be described in detail.

Figure 3A:
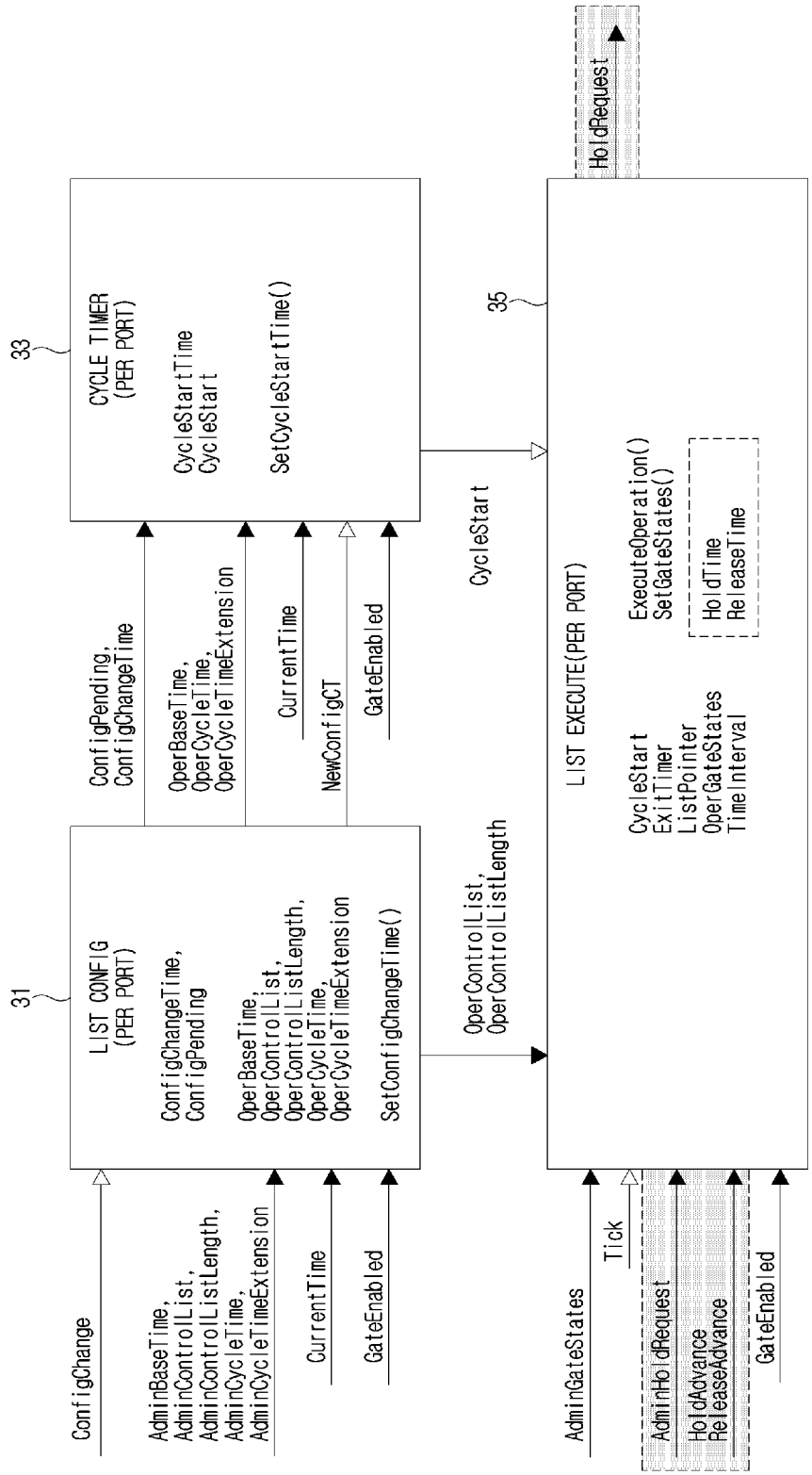
FIG. 3A is a view of an example showing a configuration of a scheduled traffic state machine according to an embodiment of the present disclosure.

FIG. 3A is a view of an example showing a configuration of a scheduled traffic state machine provided to the frame transmission control apparatus according to an embodiment of the preset disclosure Referring to FIG. 3A, a scheduled traffic state machine provided to the frame transmission control apparatus according to an embodiment of the preset disclosure may include a control list configuration unit 31, a cycle timer unit 33, and a control list executing unit 35.

The control list configuration unit 31 may generate a parameter related to setting timings of frame transmission (for example, ConfigChangTime, ConfigPendingTime, OperBaseTIme, OperCycleTime, OperCycleTimeExtention), and provide the same to the cycle timer unit 33. In addition, the control list configuration unit 31 may generate a parameter related to setting a gate control list (OperControlList, OperControlListLength), and provide the same to the control list executing unit 35.

The control list configuration unit 31 may have a configuration corresponding to "List Config state machine" defined in the IEEE 802.1Qbv standard, and the cycle timer unit 33 may have a configuration corresponding to "Cycle Timer state machine" defined in the IEEE 802.1Qbv standard.

Meanwhile, the control list executing unit 35 may generate a control signal controlling a gate in consideration of a timing provided from the cycle timer unit 33, and output the same. Particularly, the control list executing unit 35 may generate a control signal indicating stopping or resuming data transmission (for example, Hold_Request signal), and provide the same.

In detail, the control list executing unit 35 may check gate operation information for each preset time interval so as to update the gate control list, and selectively output a control signal indicating gate status information or indicating stopping or resuming data transmission (for example, Hold_Request signal) on the basis of information included in the gate operation information.

In addition, the control list executing unit 35 may set a time for stopping or resuming of data transmission (for example, HoldTime, ReleaseTime), and may control an output of a control signal indicating stopping or resuming of data transmission (for example, Hold_Request signal) in consideration of the set time (for example, HoldTime, ReleaseTime).

Figure 3B:
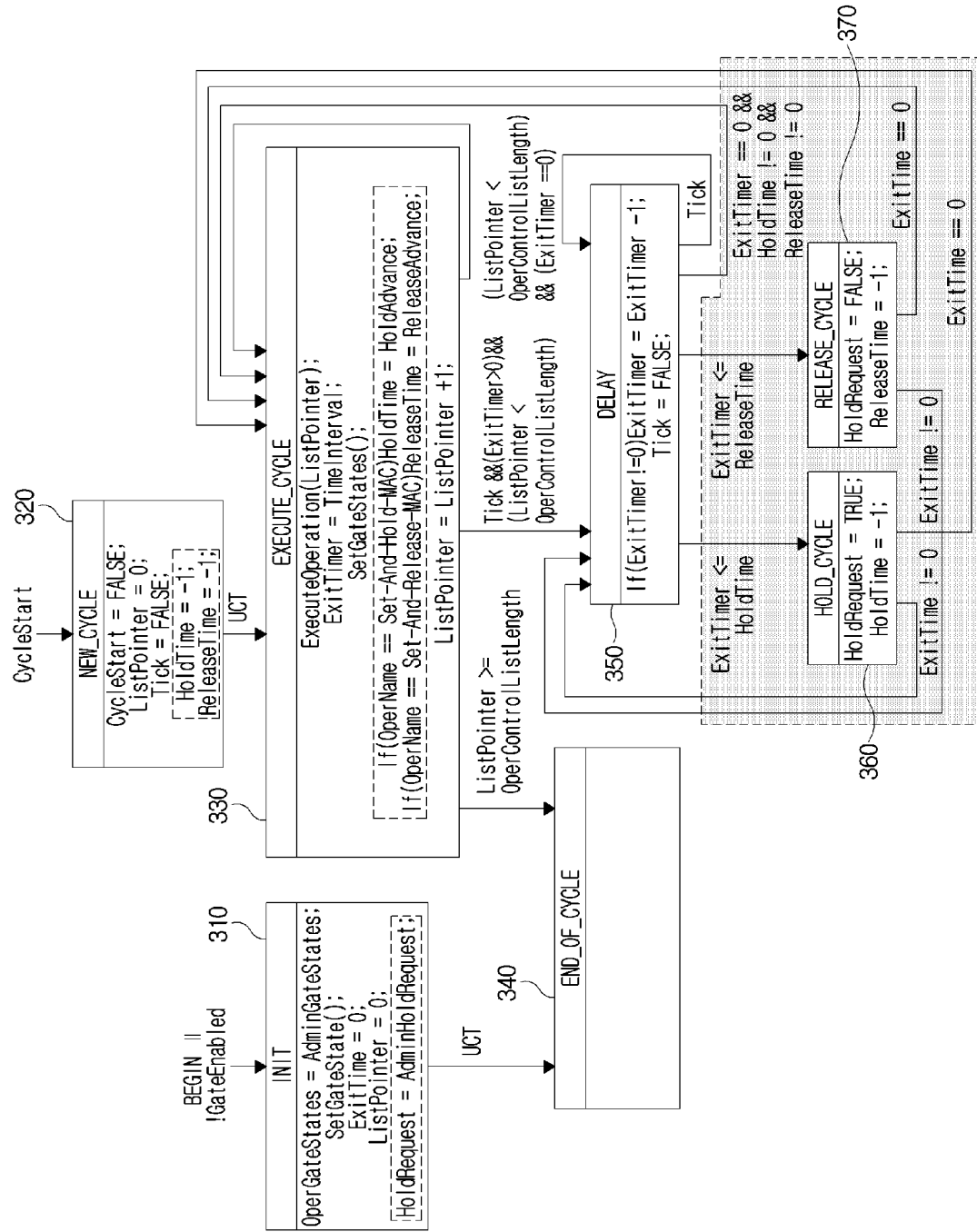
FIG. 3B is a view of an example showing in detail a state machine of a control list executing unit provided in FIG. 3A.

FIG. 3B is a view of an example showing in detail a configuration of a control list executing unit shown in FIG. 3$a$.

Hereinafter, referring to FIG. 3B, a configuration of a control list executing unit will be described in detail.

A control list executing unit may be configured with state machines, and include state machines 310, 320, 330, 340, 350, 360, and 370 respectively performing initialization, cycle starting, cycle executing, cycle ending, delaying, cycle holding, and cycle releasing.

Operation of the initialization state machine 310 may be performed by receiving a start signal (BEGIN), and a gate enabling signal (GateEnabled).

The initialization state machine 310 may perform operation of initializing a gate operation state (OperGate States), an expiration time (ExitTimer), a list pointer (ListPointer), a control signal indicating stopping or resuming of data transmission in an MAC layer, etc.

Herein, an initial value of a control signal (Hold_Request) may be set to a value designated in AdminHoldRequest, for example, may be set to a "FALSE" value. The value designated in AdminHoldRequest may variously changed by a manager.

Meanwhile, operation of the cycle starting state machine 320 may be performed when the cycle starting state machine 320 receives a control signal indicating cycle starting (CycleStart) from the cycle timer unit 33.

The cycle starting state machine 320 may perform operation of initializing a list pointer (ListPointer) within the started cycle, and initializing a data transmission stopping time (HoldTime), a data transmission resuming time (ReleaseTime), etc.

An initial value of a list pointer (ListPointer) may be set to "0". In addition, an initial value of the transmission stopping time (HoldTime) and the transmission resuming time (ReleaseTime) may be se to "−1".

In addition, the cycle executing state machine 330 may perform a gate control in a corresponding cycle. In detail, the cycle executing state machine 330 may perform operation in association with a list pointer (ExecuteOperation(ListPointer)). In addition, the cycle executing state machine 330 may set a time for controlling the corresponding operation (for example, expiration time (ExitTimer)), and update a value of the list pointer. Herein, the expiration time (ExitTimer) may be set to a time in association with a section (260-1, 260-2, 260-n) included in the cycle (250-1, 250-2, 250-n) described above.

The cycle executing state machine 330 may check gate operation information (OperName), and perform a corresponding gate control indicated by the gate operation information (OperName).

Herein, the gate operation information (OperName) may include at least one of a parameter indicating setting of a gate control list (SetGateStates), a parameter indicating stopping of data transmission in an MAC layer (Set_And_Hold_MAC), and a parameter indicating resuming of data transmission in an MAC layer (Set_And_Release_MAC). Further, the gate operation information (OperName) may further include "Unrecognized".

When gate operation information (OperName) is set as a parameter indicating setting of a gate control list, the cycle executing state machine 330 may check gate status information and output the gate status information.

Outputting of the gate status information may be performed during the gate expiration time (ExitTimer). For the same, operation of the delaying state machine 350 may be performed after the cycle executing state machine 330 outputs the gate status information.

In the delaying state machine 350, operation of repeatedly deducting the expiration time (ExitTimer) until the same becomes "0" may be performed. When the expiration time (ExitTimer) becomes "0", the corresponding operation is finished, and operation of the cycle executing state machine 330 is performed again so that a control in association with the updated list pointer may be performed.

Meanwhile, when gate operation information is set as a parameter indicating stopping transmission in MAC (Set_And_Hold_MAC), in the cycle executing state machine 330, a transmission stopping time (HoldTime) may be set.

The transmission stopping time (HoldTime) may be set to a value included in transmission stopping detail information (for example, HoldAdvance parameter), and may be set in consideration of a maximum time taken to stop frame transmission which is stored in a practical corresponding queue after the MAC processing unit receives a HoldRequest signal being "TRUE". Such a value included in a HoldAdvance parameter may be determined according to a feature of the MAC processing unit.

Figure 4:
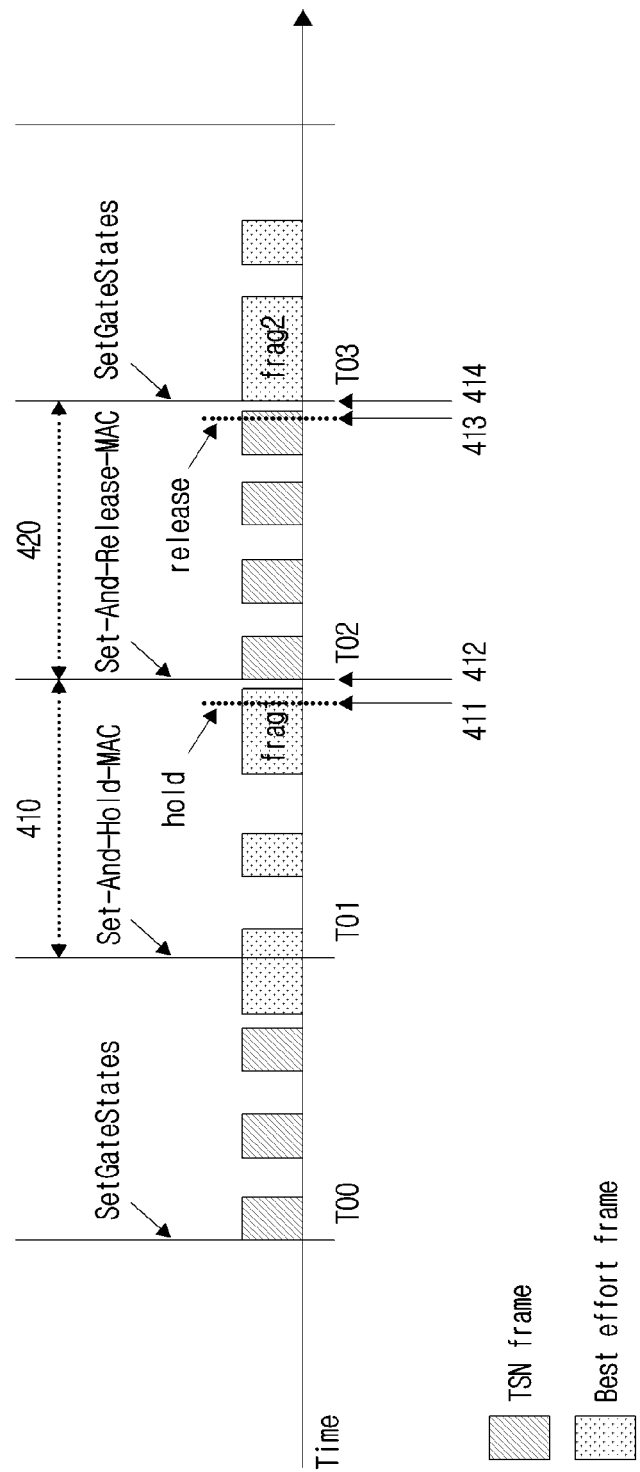
FIG. 4 is a view of an example showing a timing used for a frame transmission in the frame transmission control apparatus according to an embodiment of the present disclosure.

For example, referring to FIG. 4, at a first timing 411 of a first section 410 where operation information is set as a parameter indicating stopping transmission in MAC (Set_And_Hold_MAC), when a HoldRequest signal set to be "TRUE" is generated, the frame transmission control apparatus performs operation of stopping a frame (for example, best effort frame) transmission that is currently being transmitted, and in second section 420 that is the following section, a frame (for example, TSN frame) requiring preemption may be transmitted. Accordingly, a value included in a HoldAdvance parameter may include a time taken to resuming frame (for example, TSN frame) transmission requiring preemption after the requiring preemption is generated, in other words, a value indicating a time between the first timing 411 and the second timing 412.

Meanwhile, when an expiration time has a value relatively greater than 0, and a value of a list pointer has a value relatively smaller than the entire length of a gate control list ((ExitTimer>0)&&(ListPointer<OperControlListLength)) in the cycle executing state machine 330, operation of the delaying state machine 350 may be performed. The delaying state machine 350 may perform operation of deducting the expiration time (ExitTimer) when the expiration time (ExitTimer) is not "0", and checking whether or not the expiration time (ExitTimer) is equal to or smaller than a transmission stopping time (HoldTime).

In addition, when the expiration time (ExitTimer) is equal to or smaller than the transmission stopping time (HoldTime) in the delaying state machine 350, shifting to the cycle holding state machine 360 may be performed.

Meanwhile, when the transmission stopping time (HoldTime) is not "0" and the expiration time (ExitTimer) is "0" in the delaying state machine 350, shifting to the cycle executing state machine 330 may be performed so that a control in association with the updated list pointer may be performed.

In the cycle holding state machine 360, the HoldRequest signal may be set and output to a "TRUE" value, and a value of the transmission stopping time (HoldTime) may be reset to "−1". In addition, the expiration time (ExitTimer) may be checked in the cycle holding state machine 360. When the expiration time (ExitTimer) is "0", shifting to the cycle executing state machine 330 may be performed, and when the expiration time (ExitTimer) is not "0", shifting to the delaying state machine 350 may be performed.

Similarly, when gate operation information is set as a parameter indicating resuming transmission in MAC (Set-And-Release-MAC), the transmission resuming time (ReleaseTime) may be set in the cycle executing state machine 330.

The transmission resuming time (ReleaseTime) may be set to a value included in transmission resume detail information (for example, ReleaseAdvance parameter), and may be set in consideration of a maximum time taken to resume frame transmission stored in a practical corresponding queue after the HoldRequest signal of "FALSE" is received in the MAC processing unit. Such a value included in a ReleaseAdvance parameter may be determined according to a feature of the MAC processing unit.

For example, referring to FIG. 4, in a third timing 413 of the second section 420 which is set as Set-And-Release-MAC, when the HoldRequest signal (for example, resume signal) set as "FALSE" is generated, the frame transmission control apparatus may continue frame (for, TSN frame) transmission that is currently being transmitted, and in a third timing section 430 that is the following section, the frame (for example, best effort frame) transmission that has been stopped may be resumed. Accordingly, a value included in the ReleaseAdvance parameter may include a value of a time taken to resume the frame (for example, best effort frame) transmission that has been stopped after the resume signal occurs, that is, a time between the third timing 413 and a fourth timing 414.

Meanwhile, when the expiration time (ExitTimer) has a value relatively greater than 0 and a value of the list pointer has a value relatively smaller than the entire length of a gate control list in the cycle executing state machine 330 ((Exit-Timer>0)&&(ListPointer<OperControlListLength)), shifting to the delaying state machine 350 may be performed. The delaying state machine 350 may perform operation of deducting the expiration time (ExitTimer) when the expiration time (ExitTimer) is not "0", and checking whether or not the expiration time (ExitTimer) is equal to or smaller than the transmission resuming time (ReleaseTime).

Then, when the expiration time (ExitTimer) is equal to or smaller than the transmission resuming time (ReleaseTime) in the delaying state machine 350, shifting to the cycle releasing state machine 370 may be performed.

Meanwhile, when the transmission resuming time (ReleaseTime) is not "0" and the expiration time (ExitTimer) is "0" in the delaying state machine 350, shifting to the cycle executing state machine 330 may be performed so that a control in association with the updated list pointer may be performed.

In the cycle releasing state machine 370, the HoldRequest signal may be set and output to a "FALSE" value, and the value of the transmission resuming time (ReleaseTime) may be reset to "−1". In addition, in the cycle releasing state machine 370, the expiration time (ExitTimer) may be checked, and shifting to the cycle executing state machine 330 may be performed when the expiration time (ExitTimer) is "0", or shifting to the delaying state machine 350 may be performed when the expiration time (ExitTimer) is not "0".

Meanwhile, in the cycle executing state machine 330, when the value of the list pointer has a value equal to or relatively greater than the entire length of the gate control list (ListPointer>=OperControlListLength), shifting to the cycle ending state machine 340 may be performed so that the operation of the corresponding cycle is completed.

Further, the control list executing unit may repeatedly perform the operation of the cycle unit by using the state machines described above, and control a frame transmission.

According to the state machines of an embodiment of the present disclosure described above, in a section where gate operation information (OperName) is set as a parameter indicating stopping transmission in MAC (Set-And-Hold-MAC), a HoldRequest signal set to "TRUE" may be generated and provided, and in a section where gate operation information (OperName) is set as a parameter indicating resuming transmission in MAC (Set-And-Release-MAC), a HoldRequest signal set to "FALSE" may be generated and provided.

However, in the state machines according to an embodiment of the preset disclosure described above, a HoldRequest signal set to "TRUE" or "FALSE" may be generated after checking that gate operation information (OperName) is set as a parameter indicating stopping transmission in MAC (Set-And_Hold-MAC) or set as a parameter indicating resuming transmission in MAC (Set-And Release-MAC) in a current time interval (TimeInterval). In other words, when gate operation information (OperName) is not checked to be set as a parameter indicating stopping transmission in MAC (Set-And-Hold-MAC) or as a parameter indicating resuming transmission in MAC (Set-And-Release-MAC), a HoldRequest signal set to "TRUE" or "FALSE" may not be generated and provided. Accordingly, operation of stopping or resuming transmission in MAC is performed in the following time interval (TimeInterval) that is after operation information is checked to be set as a parameter indicating stopping transmission in MAC (Set-And_Hold-MAC) or as a parameter indicating resuming transmission in MAC (Set-And_Release-MAC).

According to the state machines of another embodiment of the preset disclosure, a state machine is provided where operation of stopping or resuming transmission in MAC may be executed at that time interval (TimeInterval) during which operation information is checked to be set as a parameter indicating stopping transmission in MAC (Set-And_Hold-MAC) or as a parameter indicating resuming transmission in MAC (Set-And_Release-MAC).

Figure 5:
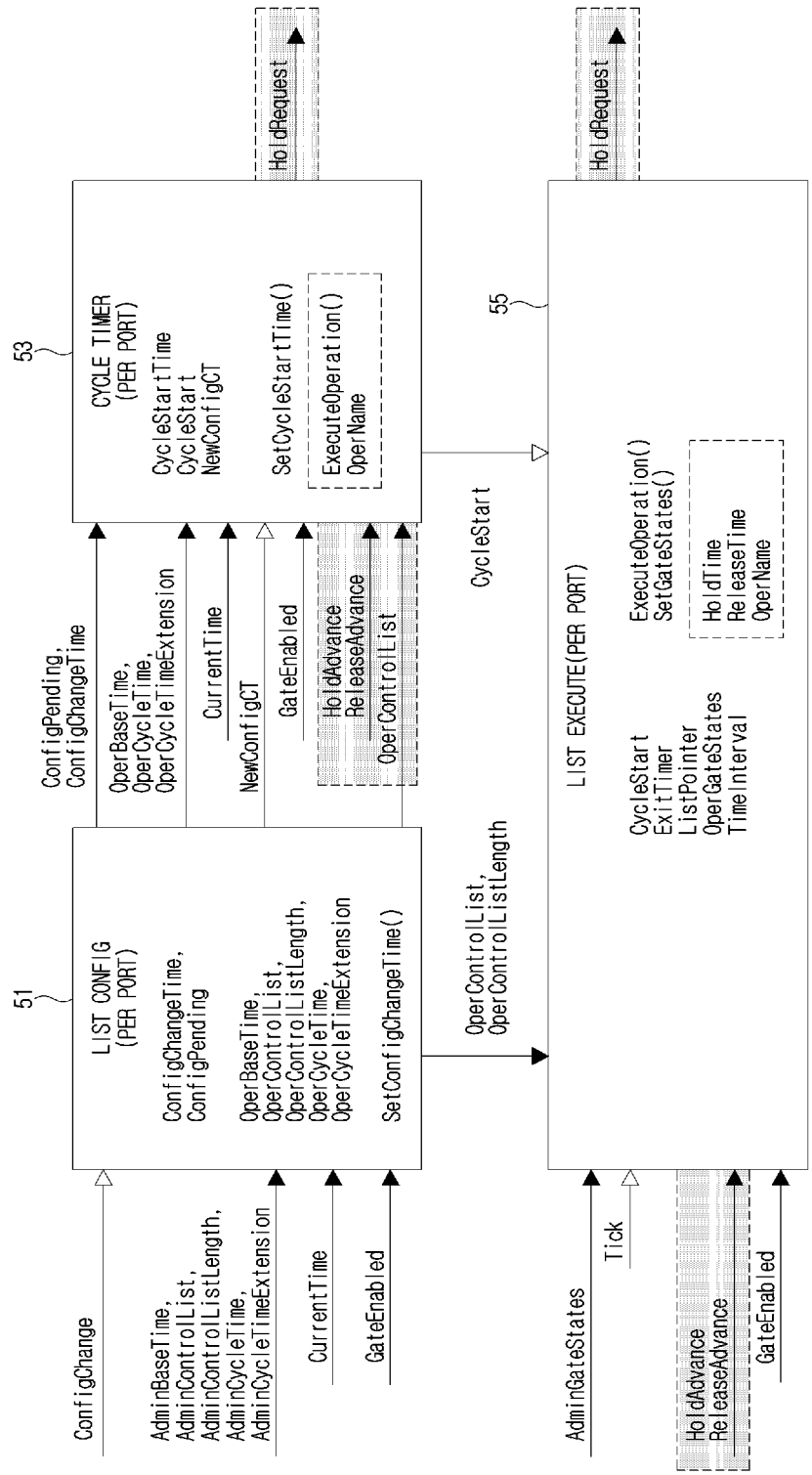
FIG. 5 a view of an example showing a configuration of a scheduled traffic state machine according to another embodiment of the present disclosure.

FIG. 5 is a view of an example showing a configuration of a scheduled traffic state machine according to another embodiment of the present disclosure.

Referring to FIG. 5, a scheduled traffic state machine according to another embodiment of the present disclosure may be identically configured to the scheduled traffic state machine according to the embodiment of the present disclosure described above, and may include a control list configuration unit 51, a cycle timer unit 53, and a control list executing unit 55. However, the scheduled traffic state machine according to another embodiment of the present disclosure is configured such that the cycle timer unit 53, in addition to the control list executing unit 55, may generate and provide a control signal (HoldRequest signal).

Particularly, the control list executing unit 35 according to the embodiment of the preset disclosure is provided to generate a control signal (HoldRequest signal) on the basis of gate operation information (OperName) of a current section, but the control list executing unit 55 according to another embodiment of the preset disclosure may be provide to generate a control signal (HoldRequest signal) on the basis of gate operation information (OperName) of the following section.

The control list executing unit 55 according to another embodiment of the preset disclosure generates a control signal (HoldRequest signal) on the basis of gate operation information (OperName) of the following section, and thus the control list executing unit 55 may not generate a corresponding control signal (HoldRequest signal) when a first section of a cycle is set as a parameter indicating stopping transmission in MAC (Set-And-Hold-MAC) or as a parameter indicating resuming transmission in MAC (Set-And-Release-MAC). Accordingly, the cycle timer unit 53 according to another embodiment of the preset disclosure may be provided to generate a corresponding control signal (HoldRequest signal) even though gate operation information (OperName) for a first section of a cycle is set as a parameter indicating stopping transmission in MAC (Set-And-Hold-MAC) or as a parameter indicating resuming transmission in MAC (Set-And-Release-MAC).

For the same, the cycle timer unit 53 may receive a gate control list (OperControlList) from the control list configuration unit 51. In addition, the cycle timer unit 53 may be provided with a HoldAdvance parameter and a ReleaseAdvance parameter.

Figure 6:
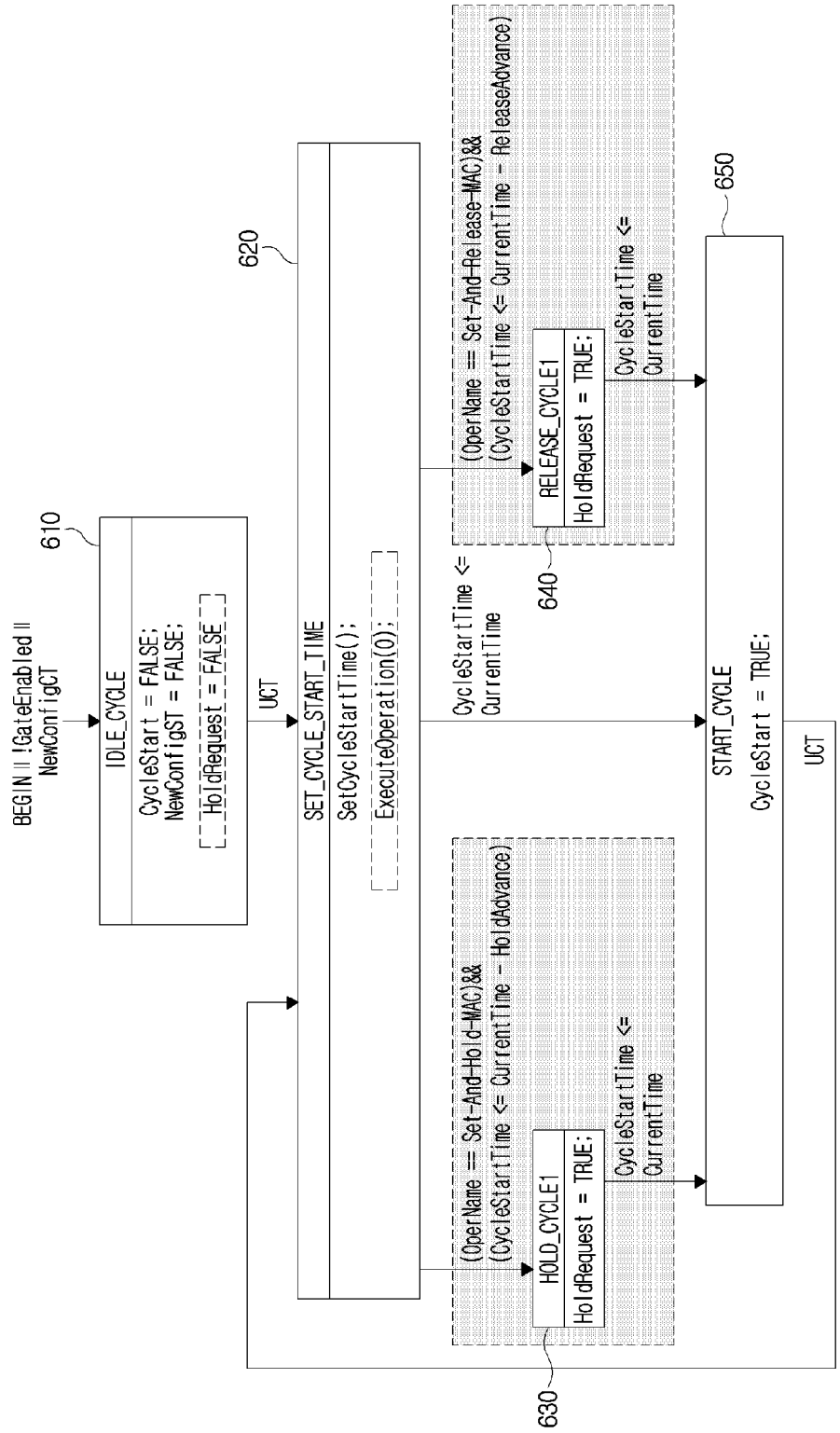
FIG. 6 is a view of an example showing in detail a cycle timer unit shown in FIG. 5.

FIG. 6 is a view of an example showing in detail a configuration of a cycle timer unit of FIG. 5.

Hereinafter, referring to FIG. 6, a configuration of a cycle timer unit will be described in detail.

The cycle timer unit may be provided as a state machine, and include state machines 610, 620, 630, 640, and 650 respectively performing cycle pausing, cycle start time setting, cycle holding, cycle releasing, and cycle starting.

By receiving a start signal (BEGIN), a gate enable signal (GateEnabled), and a parameter related to setting a new cycle timer (NewConfigCT), operation of the cycle pausing state machine 610 may be performed. In the cycle pausing state machine 610, a cycle starting factor (CycleStart) and a new cycle timer setting factor (NewConfigCT) is set to "FALSE", and a control signal (Hold_Request) indicating stopping or resuming data transmission in an MAC layer may be set to "FALSE".

In the cycle start time setting state machine 620, a cycle start time may be set. In addition, in the cycle start time setting state machine 620, operation of a first section may be performed. Particularly, in the cycle start time setting state machine 620, whether or not gate operation information is set as a parameter indicating stopping transmission in MAC (Set-And-Hold-MAC) or set as a parameter indicating resuming transmission in MAC (Set-And-Release-(MAC) may be checked in the first section.

When the gate operation information in the first section is checked to be set as a parameter indicating stopping transmission in MAC (Set-And-Hold-MAC), a cycle start time (CycleStartTime) may be compared with a "CurrentTime-HoldAdvance" value, and when the cycle start time (CycleStartTime) is equal to or relatively smaller than the "CurrentTime-HoldAdvance" value, shifting to the cycle holding state machine 630 may be performed.

In the cycle holding state machine 630, a control signal, that is, a Hold_Request signal, may be set and transmitted to a "TRUE" value. In addition, in the cycle holding state machine 630, when the cycle start time (CycleStartTime) is equal to or relatively smaller than a current time (Current-Time), shifting to the cycle starting state machine 650 may be performed.

As described above, even though gate operation information for the first section of the cycle is set as a parameter indicating stopping transmission in MAC (Set-And-Hold-MAC), a Hold_Request signal may be generated and provided in the cycle holding state machine 630.

Similarly, when gate operation information of the first section is checked to be set as a parameter indicating resuming transmission in MAC (Set-And-Release-MAC) in the cycle start time setting state machine 620, the cycle start time (CycleStartTime) may be compared with a "CurrentTime-ReleaseAdvance" value, and when the cycle start time (CycleStartTime) is equal to or relatively smaller than the "CurrentTime-ReleaseAdvance" value, shilling to the cycle releasing state machine 640 may be performed.

In the cycle releasing state machine 640, a control signal, that is, a Hold_Request signal, may be set and transmitted to a "FALSE" value. In addition, in the cycle releasing state machine 640, when the cycle start time (CycleStartTime) is equal to or relatively smaller than a current time (Current-Time), shifting to the cycle starting state machine 650 may be performed.

In the cycle starting state machine 650, the factor value of the cycle starting (CycleStart) may be set and output to be "TRUE".

Figure 7:
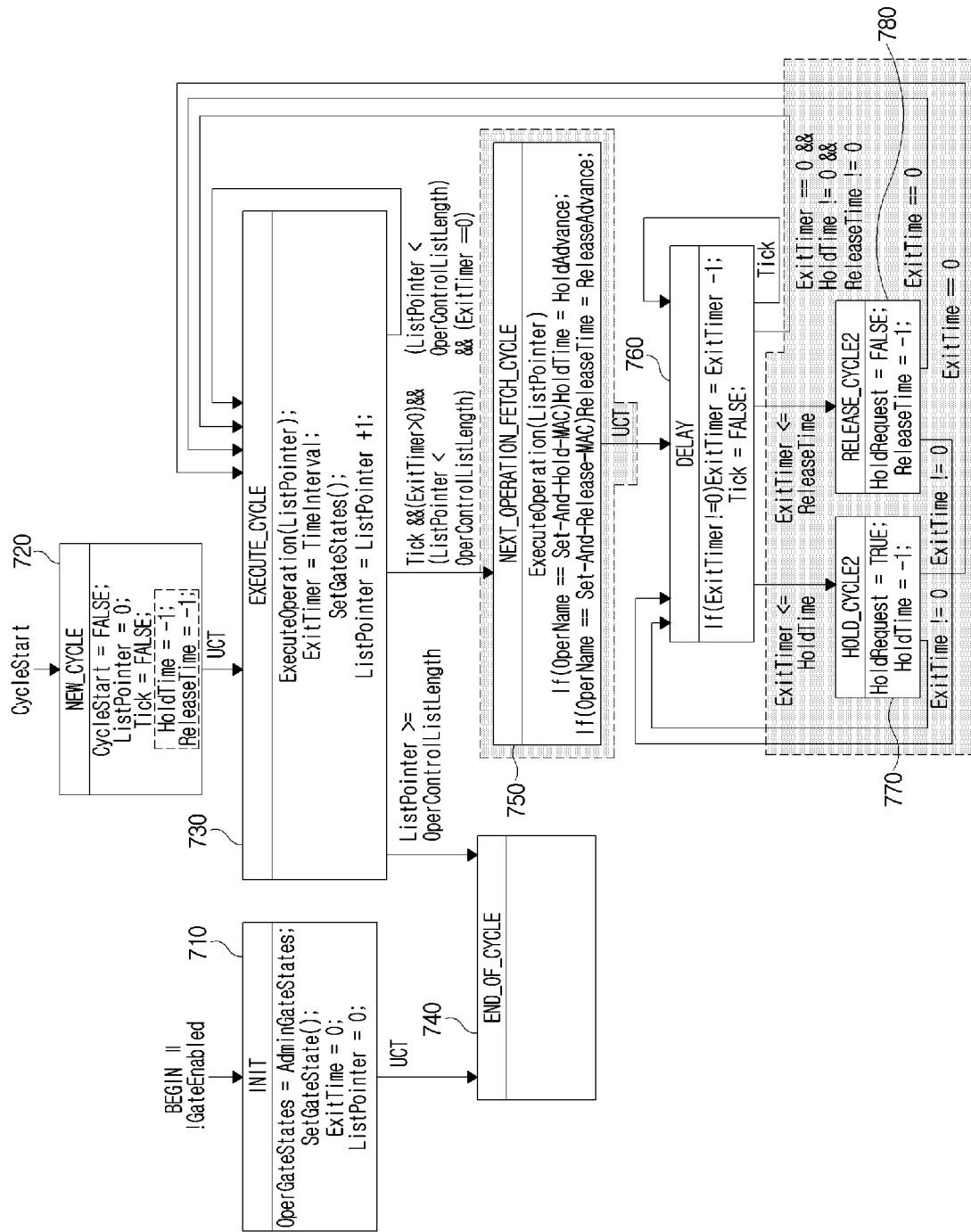
FIG. 7 is a view of an example showing in detail a configuration of a control list executing unit shown in FIG. 5.

FIG. 7 is a view of a detailed example of a configuration of the control list executing unit shown in FIG. 5.

Hereinafter, referring to FIG. 7, a configuration of a control list executing unit will be described in detail.

A control list executing unit may be configured with state machines, and may include state machines 710, 720, 730, 740, 750, 760, 770, and 780 respectively performing initialization, cycle starting, cycle executing, cycle ending, following section checking, delay, cycle holding, and cycle releasing.

In the control list executing unit according to another embodiment of the present disclosure, state machines 710, 720, 730, 740, 760, 770, and 780 performing initialization, cycle starting, cycle executing, cycle ending, delaying, cycle holding, and cycle releasing, respectively, may be identically configured to the state machines of the control list executing unit described in FIG. 3B, that is, the state machines 310, 320, 330, 340, 350, 360, and 370 performing initialization, cycle starting, cycle executing, cycle ending, delaying, cycle holding, and cycle releasing.

However, the control list executing unit according to another embodiment of the present disclosure may further include the following section checking state machine 750 checking gate operation information of a following section, and the following section checking state machine 750 may be provided between the cycle executing state machine 730 and the delaying state machine 760.

Hereinafter, operation of the control list executing unit according to another embodiment of the present disclosure will be described in detail.

First, by receiving a start signal (BEGIN), a gate enable signal (GateEnabled), operation of the initialization state machine 710 may be performed.

The initialization state machine 710 may perform operation of initializing a gate operation state (OperGate States), an expiration time (ExitTimer), a list pointer (ListPointer), a control signal (Hold_Request) indicating stopping or resuming data transmission in an MAC layer, etc.

Herein, an initial value of the control signal (Hold_Request) may be set to a value designated in AdminHoldRequest, for example, a 'FALSE' value. The value designated in AdminHoldRequest may be variably changed by a manager.

Meanwhile, when a control signal (CycleStart) indicating staring of a cycle is received from the cycle timer unit 33, operation of the cycle starting state machine 720 may be performed.

The cycle starting state machine 720 may perform operation of initializing a list pointer (ListPointer), and a data transmission stopping time (HoldTime), and a data transmission resuming time (ReleaseTime), etc. within the started cycle.

An initial value of the list pointer (ListPointer) may be set to "0". In addition, initial values of the transmission stopping time (HoldTime) and the transmission resuming time (ReleaseTime) may be set to "−1".

In addition, the cycle executing state machine 730 may perform a gate control in the corresponding cycle. In detail, the cycle executing state machine 730 may perform operation (ExecuteOperation(ListPointer)) in association with the list pointer. In addition, the cycle executing state machine 730 may set a time during which the corresponding operation is controlled (for example, expiration time (ExitTimer)), and update a value of the list pointer. Herein, the expiration time (ExitTimer) may be set to a time corresponding to the section (260-1, 260-2, 260-n) included in the cycle (250-1, 250-2, 250-n) described above.

The cycle executing state machine 730 may check gate operation information (OperName), and perform a gate control indicated in association with the gate operation information (OperName)

Herein, gate operation information (OperName) may include at least one of a parameter indicating setting of a gate control list (SetGateStates), a parameter indicate stopping data transmission in an MAC layer (Set_And_Hold_MAC), and a parameter indicating resuming of data transmission in an MAC layer (Set_And_Release_MAC). Further, gate operation information (OperName) may further include "Unrecognized".

When gate operation information (OperName) is set as a parameter indicating setting of a gate control list, the cycle executing state machine 730 may check gate status information, and output the gate status information.

In the cycle executing state machine 730, a value of the updated list pointer may be compared with the entire length of the gate control list, and when the value of the updated list pointer is a value equal to or relatively greater than the entire length of the gate control list, shifting to the cycle ending state machine 740 may be performed.

In addition, when the value of the updated list pointer is a value equal to or relatively smaller than the entire length of the gate control list, and the expiration time (ExitTimer) is "0", a gate control corresponding to the value of the updated list pointer may be performed.

Meanwhile, when the value of the updated list pointer is a value equal to or relatively smaller than the entire length of the gate control list, and the expiration time (ExitTimer) represent a value relatively greater than "0", shifting to the following section checking state machine 750 may be performed.

In the following section checking state machine 750, operation in association with the updated list pointer (ExecuteOperation(ListPointer)) may be performed. In other words, the following section checking state machine 750 may check gate operation information (OperName).

Meanwhile, when gate operation information is set as a parameter indicating stopping of transmission in MAC (Set And Hold MAC), a transmission stopping time (HoldTime) may be set in the following section checking state machine 750.

The transmission stopping time (HoldTime) may be set to a value included in transmission stopping detail information (for example, HoldAdvance parameter), and may be set in consideration of a maximum time taken to stopping frame transmission which is stored in a practical corresponding queue after a HoldRequest signal of "TRUE" is received in the MAC processing unit. Such a value included in a HoldAdvance parameter may be determined according to a feature of the MAC processing unit.

Figure 8:
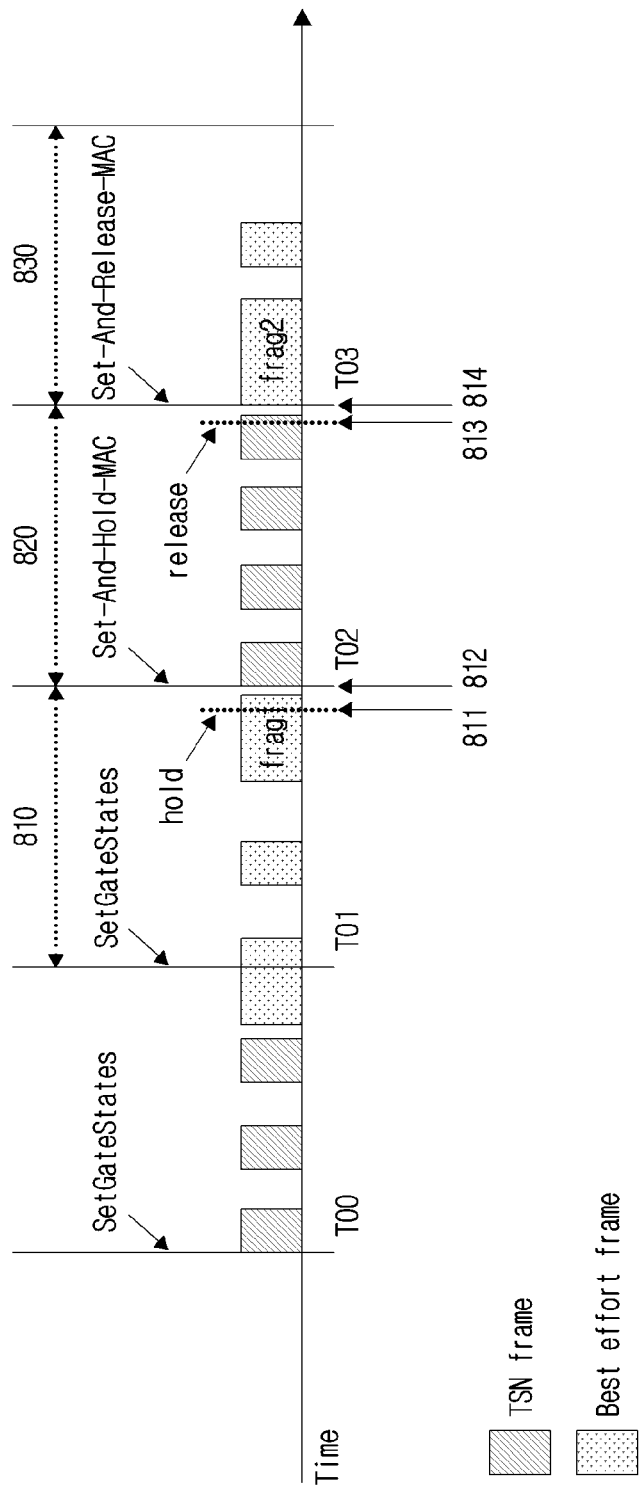
FIG. 8 is a view of an example showing a timing used for frame transmission in a frame transmission control apparatus according to another embodiment of the present invention.

For example, referring to FIG. 8, at a first timing 811 of a first section 810 which is set to SetGateStates, when a HoldRequest signal set to "TRUE" is generated according to operation information of a following section (Set_And_Hold_MAC), the frame transmission control apparatus performs a process of stopping frame (for example, best effort frame) transmission that is currently being transmitted, and transmit a frame (for example, TSN frame) requiring preemption in a following section where operation information is set as a parameter indicating stopping transmission in MAC (Set_And_Hold_MAC), that is, in a second section 820. Accordingly, a valued included in a HoldAdvance parameter may include a value indicating a time taken to resume frame (for example, TSN frame) transmission requiring preemption after the HoldRequest signal has been generated, that is, a time between the first timing 811 an the second timing 812.

When the operation of the following section checking state machine 750 is completed, shifting to the delaying state machine 760 may be performed. In the delaying state machine 760, when the expiration time (ExitTimer) is not "0", operation of deducting the expiration time (ExitTimer) may be performed, and checking whether or not the expiration time (ExitTimer) is equal to or smaller than the transmission stopping time (HoldTime) may be performed.

In addition, when the expiration time (ExitTimer) is equal to or smaller than the transmission stopping time (HoldTime) in the delaying state machine 760, shifting to the cycle holding state machine 770 may be performed.

Meanwhile, when the transmission stopping time (HoldTime) is not "0" and the expiration time (ExitTimer) is "0" in the delaying state machine 760, shifting again to the cycle executing state machine 730 may be performed so that a control in association with the updated list pointer may be performed.

In the cycle holding state machine 770, the HoldRequest signal may be set to and output to a "TRUE" value, and the transmission stopping time (HoldTime) value may be reset to "−1". In addition, in the cycle holding state machine 770, the expiration time (ExitTimer) may be checked. When the expiration time (ExitTimer) is "0", shifting to the cycle executing state machine 730 may be performed, and when the expiration time (ExitTimer) is not "0", shifting to the delaying state machine 760 may be performed.

Similarly, when gate operation information is checked to be set as a parameter indicating resuming transmission in MAC (Set-And-Release-MAC) in the following section checking state machine 750, a transmission resuming time (ReleaseTime) may be set.

The transmission resuming time (ReleaseTime) may be set to a value included in transmission resuming detail information (for example, ReleaseAdvance parameter), and may be set in consideration of a maximum time taken to resume frame transmission which is stored in a practical corresponding queue after the HoldRequest signal of "FALSE" is received in the MAC processing unit. Such a value included in a ReleaseAdvance parameter may be determined according to a feature of the MAC processing unit.

For example, referring to FIG. 8, at a third timing 813 of the second section 820 at which operation information is set as a parameter indicating stopping transmission in MAC (Set-And-Hold-MAC), when a HoldRequest signal set to "FALSE" (for example, resume signal) is generated according to operation information of a following section (Set_And_Release_MAC), the frame transmission control apparatus may continue frame (for example, TSN frame) transmission that is being transmitted, and resume frame (for example, best effort frame) transmission that has been stopped in a third section 830 that is the following section. Accordingly, a value included in a ReleaseAdvance parameter may include a value indicating a time taken to resume frame (for example, best effort frame) transmission that has been stopped after the resume signal has been generated, that is, a time between the third timing 813 and a fourth timing 814.

Meanwhile, the delaying state machine 760 may perform operation of deducting the expiration time (ExitTimer) when the expiration time (ExitTimer) is not "0", and checking whether or not the expiration time (ExitTimer) is equal to or smaller than the transmission resuming time (ReleaseTime).

In addition, when the expiration time (ExitTimer) is equal to or smaller than the transmission resuming time (ReleaseTime) in the delaying state machine 760, shifting to the cycle releasing state machine 780 may be performed.

Meanwhile, when the transmission resuming time (ReleaseTime) is not "0" and the expiration time (ExitTimer) is "0" in the delaying state machine 760, shifting again to the cycle executing state machine 730 may be performed so that a control in association with the updated list pointer may be performed.

In the cycle releasing state machine 780, the HoldRequest signal may be set and output to a "FALSE" value, and the value of the transmission resuming time (ReleaseTime) may be set to "−1". In addition, in the cycle releasing state machine 780, the expiration time (ExitTimer) may be checked, when the expiration time (ExitTimer) is "0", shifting to the cycle executing state machine 730 may be performed, and when the expiration time (ExitTimer) is not "0", shifting to the delaying state machine 760 may be performed.

Meanwhile, in the cycle executing state machine 730, when the value of the list pointer is equal to or greater than the entire length of the gate control list (ListPointer>=OperControlListLength), shifting to the cycle ending state machine 740 may be performed so that operation of the corresponding cycle may be completed.

Further, the control list executing unit may control a frame transmission by repeatedly performing operation for a cycle unit by using the state machines described above.

Figure 9:
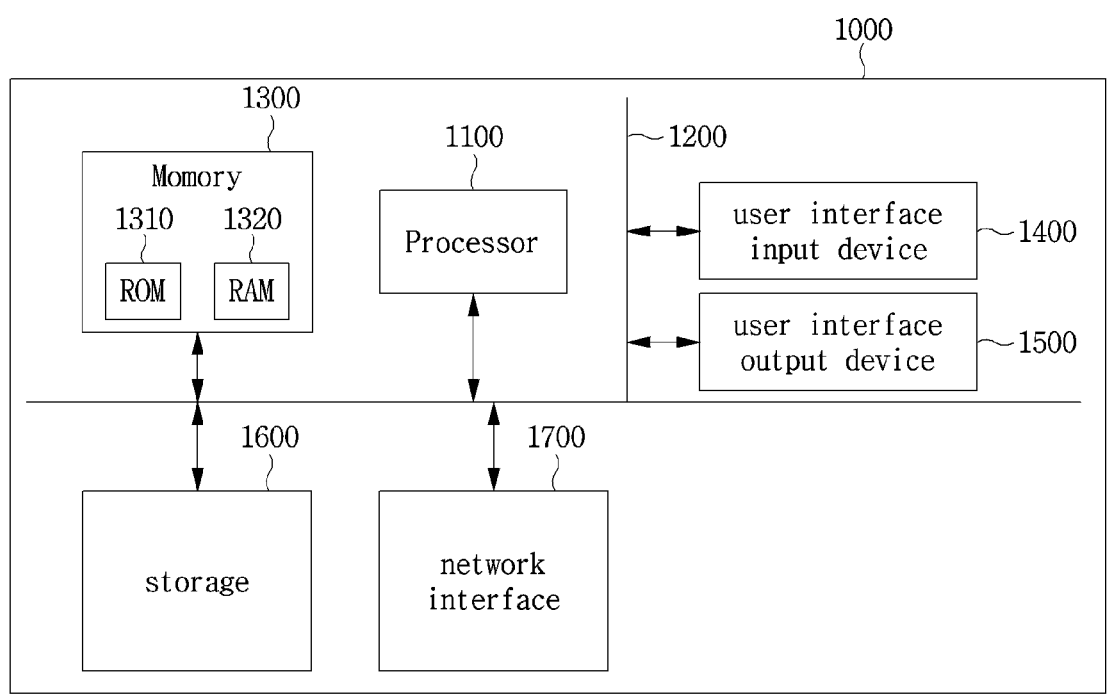
FIG. 9 is a view of a block diagram showing a frame transmission control method and a computing system executing the same.

FIG. 9 is a view of a block diagram showing a frame transmission control method and a computing system executing the same.

Referring to FIG. 9, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. An apparatus for controlling frame transmission, the apparatus comprising:
one or more processors; and
a memory having instructions stored thereon executed by the one or more processors to perform:
a list configuration unit managing a parameter related to a gate control;
a cycle timer unit managing a start timing of a cycle; and
a list executing unit performing the gate control based on the parameter provided form the list configuration unit and the cycle timer unit,
wherein the list executing unit includes:
a cycle executing state machine setting an expiration time of at least one section included in the cycle, checking gate operation information in association with a list pointer indicating the at least one section, and performing a control in association with the gate operation information;
a delaying state machine deducting the expiration time by a predetermined unit and updating the same;
a cycle holding state machine generating a control signal indicating stopping transmission in MAC; and
a cycle releasing state machine generating a control signal indicating resuming the transmission in MAC.

2. The apparatus of claim 1, wherein the gate operation information includes at least one of a parameter indicating setting of a gate control list, a parameter indicating stopping of the transmission in MAC, and a parameter indicating resuming the transmission in MAC.

3. The apparatus of claim 1, wherein:
in association that the gate operation information indicates stopping the transmission in MAC, a transmission stopping time is set, and
in association that the gate operation information indicates resuming the transmission in MAC, a transmission resuming time is set.

4. The apparatus of claim 3, wherein:
when the expiration time has a value equal to or relatively smaller than the transmission stopping time, an operation of the cycle holding state machine is performed, and
when the expiration time has a value equal to or relatively smaller than the transmission resuming time, an operation of the cycle releasing state machine is performed.

5. The apparatus of claim 3, wherein:
the transmission stopping time is a time set in consideration of a maximum time taken to stop frame transmission which is stored in a queue, and
the transmission resuming time is a time set in consideration of a maximum time taken to resume frame transmission which is stored in a queue.

6. A method of controlling data transmission, wherein the method controls transmission of at least one first packet having a first priority and at least one second packet having a second priority which are output from an identical port, and controls the at least one packet to be transmitted relatively precedent than the at least one second packet, the method comprising:

performing a gate control of one of the following operations:

opening a gate of an output queue to which the at least one first packet is transferred, and closing a gate of an output queue to which the at least one second packet is transferred; and closing the gate of the output queue to which the at least one first packet is transferred, and opening the gate of the output queue to which the at least one second packet is transferred, wherein a transmission control command indicating stopping or resuming the transmission of the at least one second packet is generated at a timing relatively before a timing when the gate control is performed, and wherein the gate control is performed by generating a transmission control command indicating stopping the transmission of the at least one second packet at a first time section, opening the gate of the output queue to which the at least one first packet is transferred and closing the gate of the output queue to which the at least one second packet is transferred at a second time section.

7. The method of claim 6, wherein the gate control is performed by generating a transmission control command indicating resuming the transmission of the at least one second packet at the second time section, closing the gate of the output queue to which the at least one first packet is transferred and opening the gate of the output queue to which the at least one second packet is transferred at a third time section.

8. The method of claim 6, further comprising:

setting an expiration time of at least one time section included in a cycle;

checking gate operation information in association with a list pointer indicating the at least one time section;

in association that the gate operation information indicates stopping of transmission in MAC, setting a transmission stopping time;

outputting transmission control command indicating stopping the transmission in MAC by a delaying state machine and a cycle holding state machine in which the expiration time and a transmission stopping time are set;

in association that the gate operation information indicates resuming the transmission in MAC, setting a transmission resuming time; and outputting transmission control command indicating resuming the transmission in MAC by the delaying state machine and the cycle releasing state machine in which the expiration time and the transmission resuming time are set.

9. The method of claim 8, further comprising initializing the expiration time, the list pointer, the gate operation information, and the control signal indicating stopping the transmission in MAC.

10. The method of claim 8, further comprising:

updating the list pointer, and determining the updated gate operation information corresponding to the updated list pointer, and generating the transmission control command corresponding to the updated gate operation information.

11. The method of claim 10, further comprising:

setting the transmission stopping time in association that the updated gate operation information indicates stopping the transmission in MAC, and setting transmission resuming time in association that the updated gate operation information indicates resuming the transmission in MAC.

12. The method of claim 8, further comprising:

determining the gate operation information in association with a first time section included in the cycle, and generating the transmission control command corresponding to the determined gate operation information.

13. An apparatus for controlling frame transmission, the apparatus comprising:

one or more processors; and a memory having instructions stored thereon executed by the one or more processors to perform:

a list configuration unit managing a parameter related to a gate control;

a cycle timer unit managing a start timing of a cycle; and a list executing unit performing the gate control based on the parameter provided form the list configuration unit and the cycle timer unit, wherein the list executing unit includes:

a cycle executing state machine setting an expiration time of at least one time section included in the cycle, checking gate operation information in association with a list pointer indicating the at least one time section, performing a control in association with the gate operation information, and updating the list pointer into a value of a next time section included in the cycle, a next cycle operation determining the updated gate operation information corresponding to the updated list pointer, and performing the control in association with the updated gate operation information, a next cycle operation checking state machine checking gate operation information in association with at least one time section included in a next cycle.

14. The apparatus of claim 13, wherein the next cycle operation checking state machine sets the transmission stopping time in association that the updated gate operation information indicates stopping the transmission in MAC.

15. The apparatus of claim 13, wherein the next cycle operation checking state machine sets the transmission resuming time in association that the updated gate operation information indicates resuming the transmission in MAC.

16. The apparatus of claim 13, wherein the cycle timer unit checks gate operation information in association with a first section included in the cycle, and generates the control signal indicating stopping the transmission in MAC or the control signal indicating resuming the transmission in MAC based on the gate operation information.

17. The apparatus of claim 16, wherein the cycle timer unit includes:

a start time setting state machine setting a start timing of the cycle, and checking the gate operation information in association with the first section included in the cycle;

a second cycle holding state machine generating the control signal indicating stopping the transmission in MAC; and a second cycle releasing state machine generating the control signal indicating resuming the transmission in MAC.

18. The apparatus of claim 17, wherein when the gate operation information indicates stopping the transmission in MAC, and a value obtained by subtracting a value included in transmission stopping detail information from a current time represents a value equal to or relatively greater than the start timing of the cycle, an operation of the second cycle holding state machine is performed.

19. The apparatus of claim 17, wherein when the gate operation information indicates resuming the transmission in MAC and a value by subtracting a value included in the transmission resuming detail information from a current time represents a value equal to or relatively greater that the start time of the cycle, an operation of the second release cycle state machine is performed.

* * * * *